(12) United States Patent
Lasjaunias et al.

(10) Patent No.: US 12,287,281 B2
(45) Date of Patent: Apr. 29, 2025

(54) SYSTEM FOR LOCATING A WOVEN PREFORM TRACER

(71) Applicant: SAFRAN, Paris (FR)

(72) Inventors: Benoît Vincent Pierre Lasjaunias, Moissy-Cramayel (FR); Rémi Magro, Antony (FR); Romain Venat, Moissy-Cramayel (FR)

(73) Assignee: SAFRAN, Paris (FR)

( * ) Notice: Subject to any disclaimer, the term of this patent is extended or adjusted under 35 U.S.C. 154(b) by 200 days.

(21) Appl. No.: 17/908,020

(22) PCT Filed: Mar. 1, 2021

(86) PCT No.: PCT/FR2021/050345
§ 371 (c)(1),
(2) Date: Aug. 30, 2022

(87) PCT Pub. No.: WO2021/176171
PCT Pub. Date: Sep. 10, 2021

(65) Prior Publication Data
US 2023/0085892 A1    Mar. 23, 2023

(30) Foreign Application Priority Data
Mar. 4, 2020 (FR) ...................................... 2002177

(51) Int. Cl.
G01N 21/21 (2006.01)
B29C 45/14 (2006.01)
(Continued)

(52) U.S. Cl.
CPC ....... *G01N 21/21* (2013.01); *B29C 45/14065* (2013.01); *G02B 27/286* (2013.01);
(Continued)

(58) Field of Classification Search
CPC ................. G01N 21/211; G01N 21/21; G01N 2021/8472; B29C 45/14065; B29C 2045/14172
See application file for complete search history.

(56) References Cited

U.S. PATENT DOCUMENTS 2,625,850 A     1/1953  Stanton
8,339,602 B1 * 12/2012  Liphardt .............. G01N 21/211
                                             356/369
(Continued)

FOREIGN PATENT DOCUMENTS

DE    102008018752 A1   10/2009
FR         2985939 A1    7/2013
JP       2016065821 A  *  4/2016  ............. G01N 21/21
KR        100757378 B1 *  9/2007  ............ G01N 21/211

OTHER PUBLICATIONS

Written Opinion of the International Searching Authority mailed Jun. 16, 2021, issued in corresponding International Application No. PCT/FR2021/050345, filed Mar. 1, 2021, 8 pages.
(Continued)

*Primary Examiner* — Maurice C Smith
(74) *Attorney, Agent, or Firm* — Christensen O'Connor Johnson Kindness PLLC

(57) ABSTRACT

A system for locating a strand including fibers of a first woven preform material, the preform including, at the surface, strands of fibers of a second material and the strand including fibers of the first material forming a tracer. The system further includes a camera; a light source emitting a non-polarized incident beam configured to be directed towards the preform; a polarizer configured to polarize the non-polarized incident beam before interacting with the preform in order to obtain a polarized incident beam; and a crossed analyzer; the first material being chosen from among glass, aramid and aluminum oxide; the second material being chosen from among carbon and silicon carbide; the
(Continued)

camera being configured to film a reflected beam originating from the interaction of the polarized incident beam with the preform, the reflected beam having previously crossed the crossed analyzer, so as to locate the tracer of the preform.

13 Claims, 4 Drawing Sheets

(51) Int. Cl.
    *G02B 27/28*     (2006.01)
    *G01N 21/17*     (2006.01)
    *G01N 21/84*     (2006.01)
    *H04N 23/63*     (2023.01)

(52) U.S. Cl.
    CPC .............. *B29C 2045/14172* (2013.01); *G01N 2021/177* (2013.01); *G01N 2021/8444* (2013.01); *G01N 2021/8472* (2013.01); *G01N 2201/062* (2013.01); *G01N 2201/0634* (2013.01); *H04N 23/632* (2023.01)

(56) References Cited

U.S. PATENT DOCUMENTS

| | | | |
|---|---|---|---|
| 8,705,034 | B2 | 4/2014 | Fukazawa et al. |
| 2010/0296096 | A1 | 11/2010 | Horváth et al. |
| 2010/0302541 | A1* | 12/2010 | Gao ...................... G01N 21/211 356/369 |
| 2020/0262107 | A1* | 8/2020 | Guha ...................... B29B 11/12 |

OTHER PUBLICATIONS

International Preliminary Report on Patentability mailed Sep. 6, 2022, issued in corresponding International Application No. PCT/FR2021/050345, filed Mar. 1, 2021, 1 page.
International Search Report mailed Jun. 16, 2021, issued in corresponding International Application No. PCT/FR2021/050345, filed Mar. 1, 2021, 2 pages.
Written Opinion of the International Searching Authority mailed Jun. 16, 2021, issued in corresponding International Application No. PCT/FR2021/050345, filed Mar. 1, 2021, 9 pages.

\* cited by examiner

[Fig. 1]
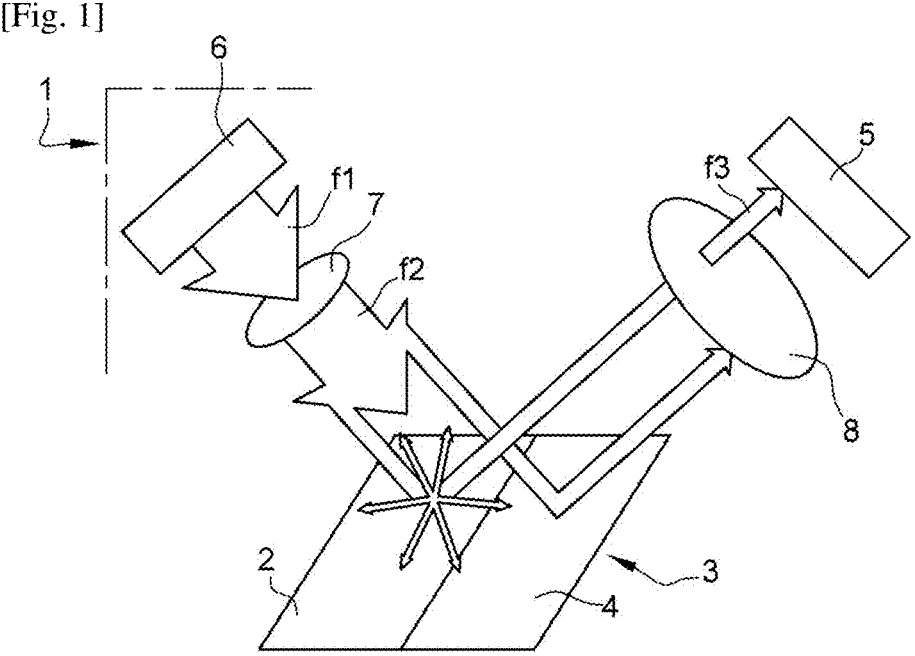
[Fig. 2]
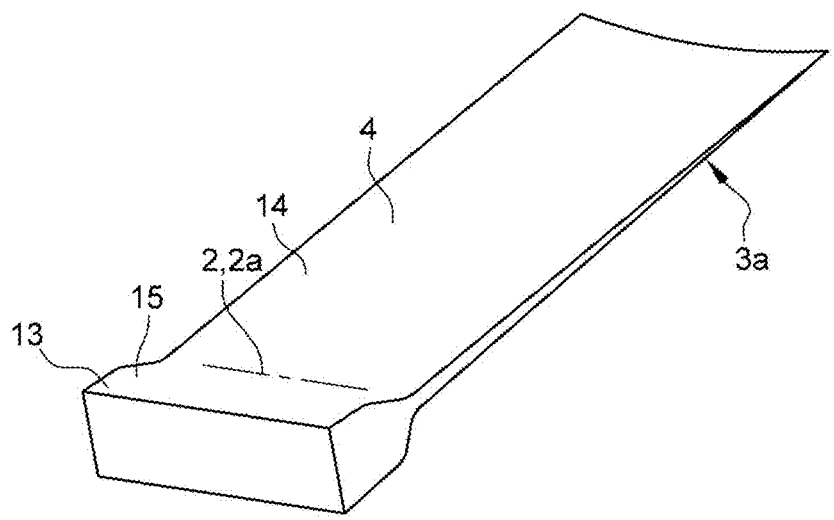

[Fig. 3]
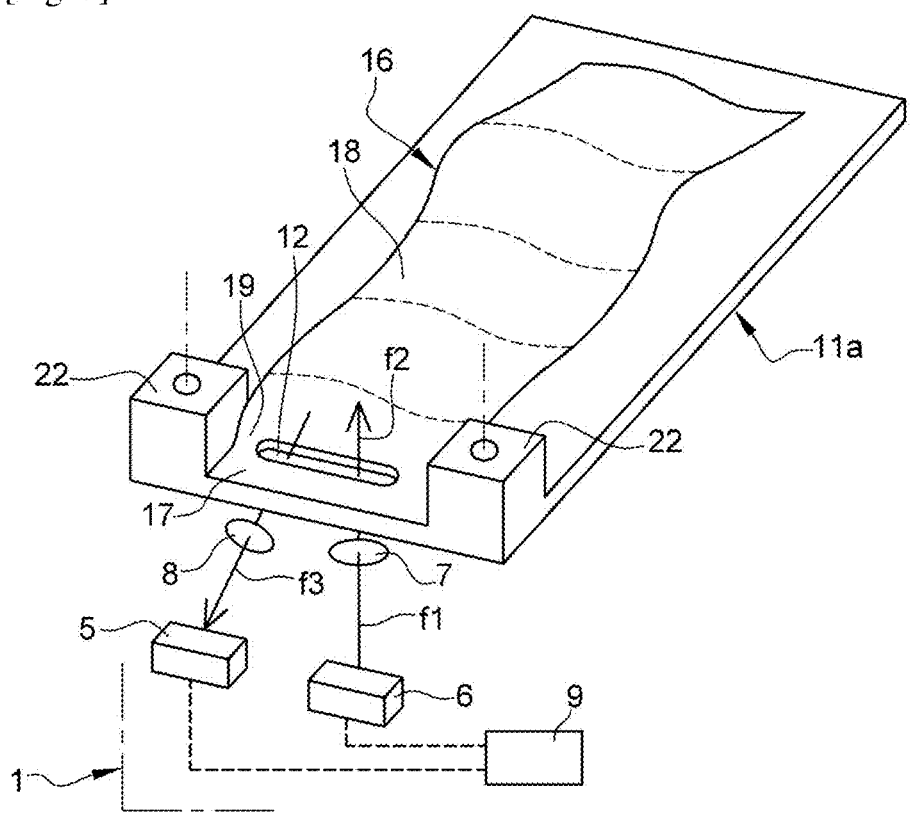
[Fig. 4]
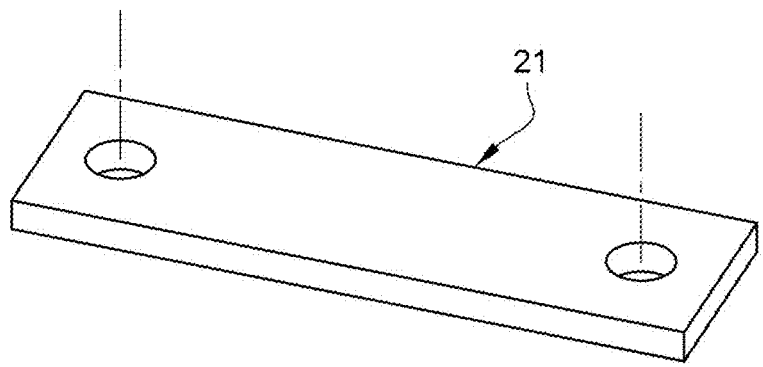

[Fig. 5]
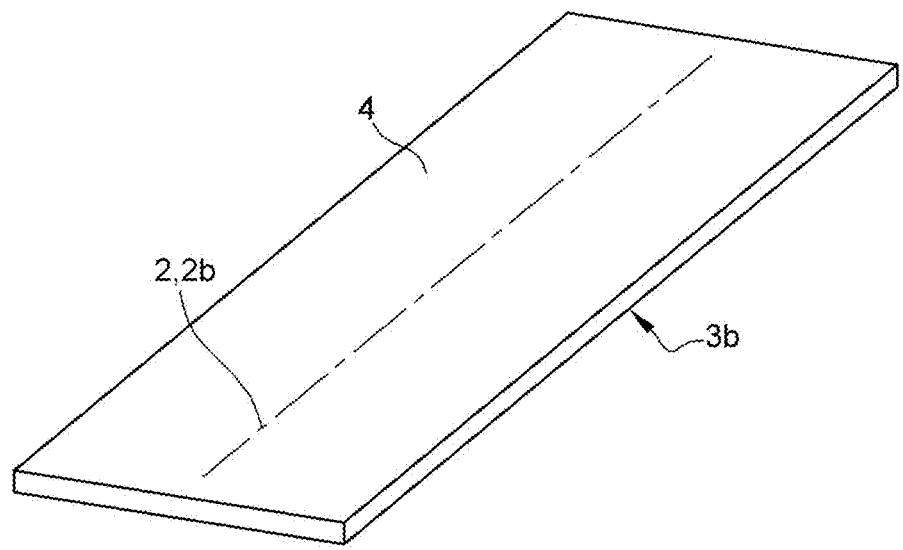
[Fig. 6]
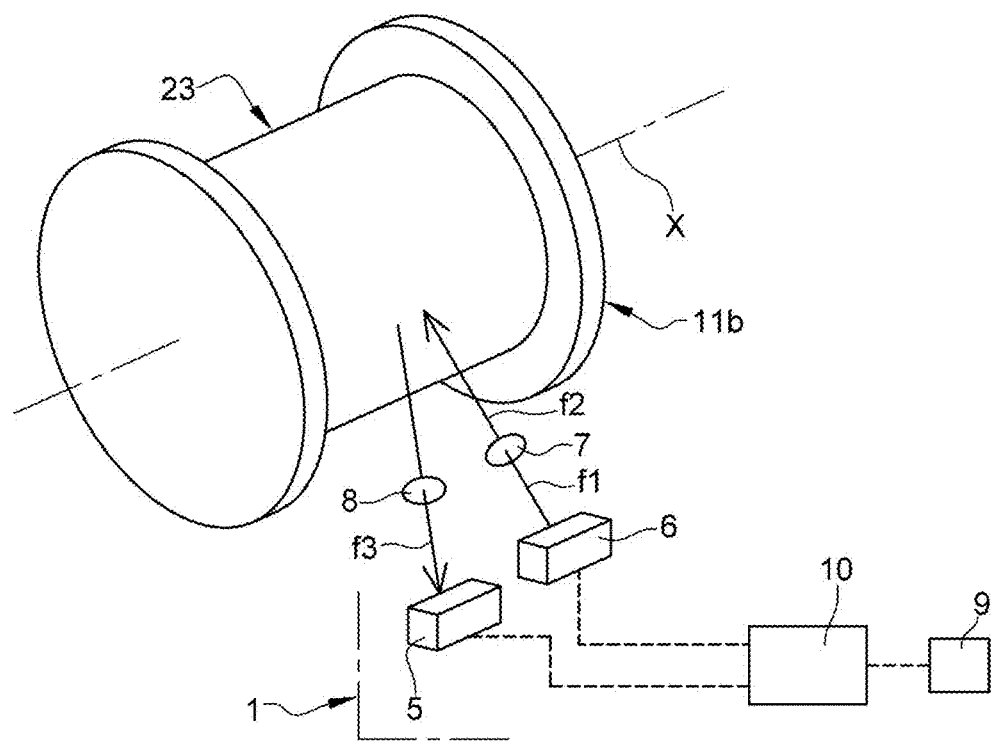

[Fig. 7]
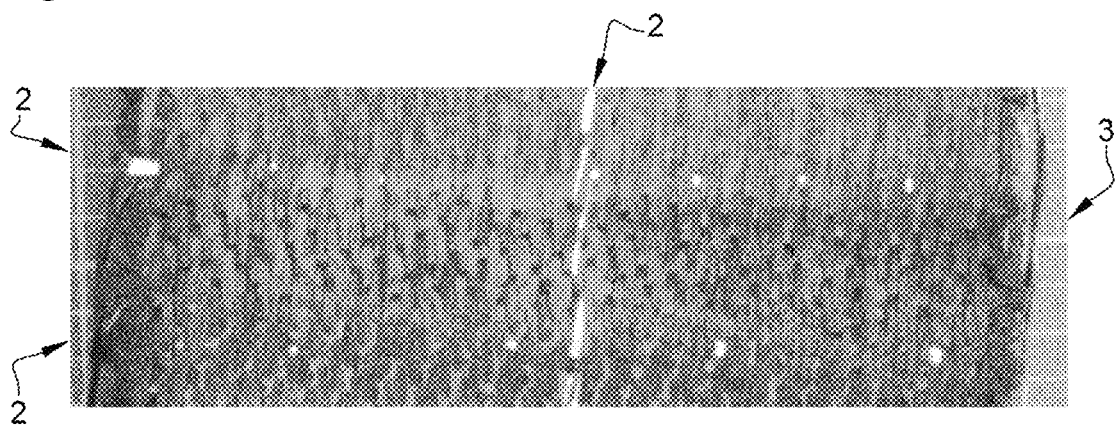
[Fig. 8]
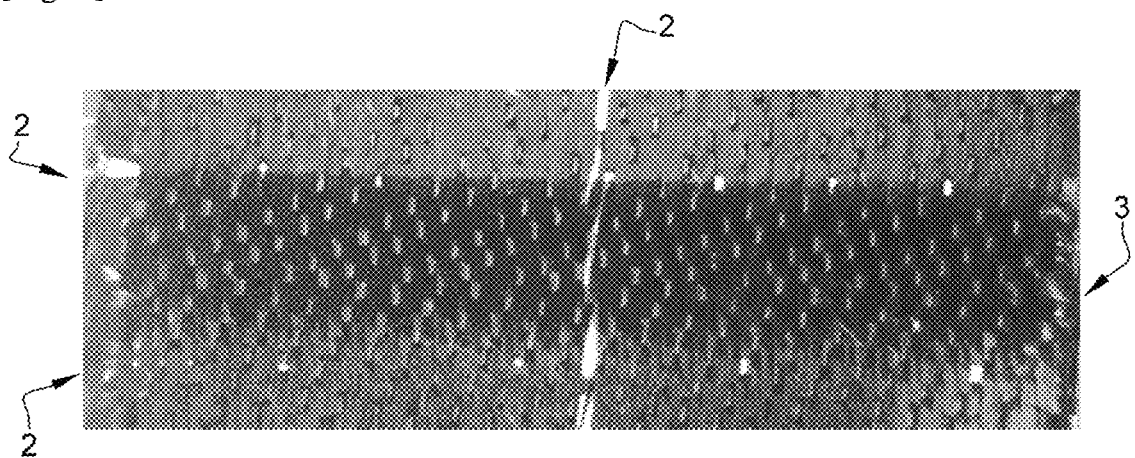

SYSTEM FOR LOCATING A WOVEN PREFORM TRACER

CROSS-REFERENCES TO RELATED APPLICATIONS

This application is a National Stage of International Application No. PCT/FR2021/050345, filed Mar. 1, 2021, which claims priority to French Patent Application No. 2002177, filed Mar. 4, 2020, the entire disclosures of which are hereby incorporated by reference in their entirety.

TECHNICAL FIELD OF THE DISCLOSURE

Embodiments of the present disclosure relate to the general field of composite material parts.

BACKGROUND

Classically, a composite material part comprises a reinforcement (for example a fibrous reinforcement) and a matrix (for example a polymer resin).

The manufacturing method of such a part comprises various operations. First, an operation referred to as "weaving" consists of flat-weaving a flat preform by means of a loom from strands of fibers (for example strands of carbon fibers). The preform is intended to form the reinforcement of the composite part.

Secondly, an operation referred to as "cutting" consists of cutting the flat preform using a cutting mold.

Thirdly, an operation referred to as "forming" consists of forming the flat preform in three dimensions using a forming mold.

Fourth, an operation referred to as "injecting" consists of injecting the matrix into an injection mold in which the preform is located in three dimensions, so as to obtain the composite part.

During the weaving operation, it is known to incorporate at least one strand comprising fibers of a light colored material (e.g. glass fibers) forming a tracer, and in other words a reference that can be used throughout the manufacturing method. In the case of a tracer comprising glass fibers, the tracer is visually identifiable by the white color of the glass fibers. Classically, the preform comprises several tracers.

As mentioned above, during the manufacturing method, it is known to use this tracer as a reference. For example, a tracer can be used to position the preform relative to a mold.

In the case of manual positioning of the preform and to locate a tracer arranged in an area of the preform that is not directly visible to the operator, for ergonomic reasons, it is known to use a camera filming the desired area and a screen on which the filmed images are displayed live. To position the preform in relation to the mold, the operator must position the tracer in relation to a reference frame, using the screen.

However, in practice, it has been found that the operator cannot correctly distinguish the tracer on the screen, despite the white color of the glass fibers. Indeed, the optical properties of the carbon (specular reflection) considerably attenuate the white color of the glass fibers.

Thus, in practice, the operators do not use the screen and position the tracer of the preform approximately in relation to the reference frame. Such a positioning considerably increases the number of defective preforms and does not allow to have a traceability of the preforms.

The objective of the present disclosure is therefore to provide a simple, effective and economical solution to the above-mentioned problem.

SUMMARY

The disclosure thus proposes a system for locating at least one strand comprising fibers of a first material of a woven preform of a part made of composite material, the preform comprising strands of fibers of a second material on its surface and at least the strand comprising fibers of the first material forming a tracer, the system comprising a camera; wherein the system further comprises:
 a light source emitting an unpolarized incident beam adapted to be directed towards the preform;
 a polarizer having a first polarization direction, the polarizer being adapted to polarize the unpolarized incident beam before interacting with the preform to obtain a polarized incident beam;
 a cross analyzer having a second polarization direction;
 the first material being selected from glass, aramid and alumina oxide;
 the second material being selected from carbon and silicon carbide;
 the camera being adapted to film a reflected beam resulting from the interaction of the polarized incident beam with the preform, the reflected beam having previously passed through the cross analyzer, so as to locate the tracer of the preform.

Such a system allows to easily locate the tracer of the preform from the images filmed by the camera, in order for example to position or control the preform. Such a system thus allows to significantly reduce the number of defective preforms, and consequently of defective parts.

Indeed, the system exploits the differences of optical properties between the first material and the second material, to highlight the fibers of the first material on the images filmed by the camera. The camera thus only films the light rays reflected by the fibers of the first material of the tracer.

Such a system also allows to guarantee the traceability of the preforms, and more generally of the composite material parts.

The system according to the disclosure may comprise one or more of the following characteristics and/or steps, taken alone or in combination with each other:
 the system comprises a diffuser, the unpolarized incident beam passing through the diffuser before passing through the polarizer;
 the system comprises a screen on which images filmed by the camera are displayed live;
 the system comprises a control device configured to automatically process images filmed by the camera;
 the light source comprises a plurality of light emitting diodes;
 the first material is glass or aramid, and the second material is carbon.

The present disclosure further relates to a method for positioning a woven preform of a composite material part with respect to a mold, the preform comprising on its surface at least one strand comprising fibers of a first material forming a tracer and strands of fibers of a second material, by means of the system as previously described, the first material being selected from glass, aramid and alumina oxide, the second material being selected from carbon and silicon carbide, the method comprising a step consisting in:

a) positioning the preform in relation to the mold from the images filmed by the camera by positioning the tracer of the preform with respect to a reference frame.

The positioning method according to the disclosure may comprise one or more of the following characteristics and/or steps, taken alone or in combination with each other:
the step a) is performed by an operator with the aid of a screen on which the images filmed by the camera are displayed live;
the reference frame is formed by a slit opening into an indentation of the mold in which the preform is located, the unpolarized incident beam of the light source being directed towards the preform via the slit;
the positioning method is implemented during an operation of cutting the preform in a cutting mold and/or an operation of three-dimensional forming of the preform in a forming mold and/or an operation of injecting a matrix into an injection mold in which the preform is located.

The present disclosure also relates to a method for controlling a woven preform of a composite material part, the preform comprising on its surface at least one strand comprising fibers of a first material forming a tracer and strands of fibers of a second material, by means of the system as previously described, the first material being selected from glass, aramid and alumina oxide, the second material being selected from carbon and silicon carbide, the method comprising a step consisting in:
a) controlling that the tracer of the preform is within a predefined interval from the images filmed by the camera.

The control method according to the disclosure may comprise one or more of the following characteristics and/or steps, taken alone or in combination with each other:
the step a) is performed by a control device configured to automatically process images filmed by the camera;
the control method is implemented during an operation of cutting the preform in a cutting mold and/or a three-dimensional forming operation of the preform in a forming mold and/or an injection operation of a matrix into an injection mold in which the preform is located.

DESCRIPTION OF THE DRAWINGS

The disclosure will be better understood and other details, characteristics and advantages of the present disclosure will become clearer from the following description made by way of non-limiting example and with reference to the attached drawings, in which:
FIG. 1 is a schematic view of a system according to the disclosure;
FIG. 2 is a perspective view of a vane preform;
FIG. 3 is a perspective view of a mold for forming the vane preform shown in FIG. 2;
FIG. 4 is a perspective view of a wedge fitted to the mold shown in FIG. 3;
FIG. 5 is a perspective view of a casing preform;
FIG. 6 is a perspective view of a mold for forming the casing preform shown in FIG. 5;
FIG. 7 is an image obtained by a system according to the prior art; and
FIG. 8 is an image obtained by a system according to the disclosure.

DETAILED DESCRIPTION

FIG. 1 shows schematically a system 1 for locating at least one strand 2 comprising fibers of a first material (forming a tracer) of a woven preform 3 of a composite material part.

The composite material part is, for example, a part of an aircraft turbomachine, such as a vane of a fan or a casing of a fan.

The composite material part comprises a reinforcement in the form of a woven fibrous preform 3, 3a, 3b and an organic matrix such as a polymer resin.

Such a part is manufactured according to a manufacturing method comprising various operations.

First, a weaving operation consists of flat-weaving a flat preform by means of a loom from strands of fibers. The woven preform then comprises warp strands (i.e. strands extending along the length of the preform) and weft strands (i.e. strands extending along the width of the preform).

The preform is for example woven by means of a Jacquard loom.

Advantageously, the weaving of the preform is a three-dimensional weaving.

Secondly, a cutting operation consists of cutting the flat preform using a cutting mold.

Thirdly, a forming operation consists of forming the flat preform in three dimensions using a forming mold.

The forming mold has an indentation whose shape corresponds substantially to that of the part to be produced.

Fourth, an injection operation consists of injecting the matrix (e.g., a polymer resin) into an injection mold in which the three-dimensional preform is located.

Advantageously, the injection operation is obtained via a method known by the English acronym RTM for "Resin Transfer Molding". Such an RTM method uses an injection mold comprising two opposing shells that are movable relative to each other. The shells each comprise an indentation, the indentations delimiting a cavity in which the preform is placed and the matrix injected.

Advantageously, the different operations of the manufacturing method are performed in the order defined above. The different operations of the manufacturing method can be performed manually and/or automatically.

The preform 3, 3a, 3b comprises on its surface at least the strand 2 comprising fibers of a first material forming a tracer and strands 4 of fibers of a second material. A tracer corresponds to a reference (or a mark) that can be used throughout the manufacturing method of the part, in order for example to position or control the preform 3, 3a, 3b during an operation.

The first material is selected from glass, aramid and alumina oxide. The second material is selected from carbon and silicon carbide.

Advantageously, to facilitate the identification of a tracer, the fibers of the first material are light and the fibers of the second material are dark.

In a first preferred combination, the first material is glass and the second material is carbon. Classically, the carbon fibers are black and the glass fibers are white.

In a second preferred combination, the first material is aramid and the second material is carbon. Classically, the carbon fibers are black and the aramid fibers are yellow.

In a third preferred combination, the first material is silicon carbide and the second material is alumina oxide. Classically, the silicon carbide fibers are black in color and the alumina oxide fibers are yellowish white.

To facilitate its identification, a tracer is located on the surface of the preform 3, 3a, 3b.

As an example, a tracer may comprise two-thirds fibers of the first material and one-third fibers of the second material. A tracer may also comprise one hundred percent fiber of the first material.

The preform 3, 3a, 3b can of course comprise several tracers. Advantageously, the tracer is integrated into the preform 3, 3a, 3b during the weaving operation.

A tracer can be a warp strand (hereinafter referred to as warp tracer or longitudinal tracer) or a weft strand (hereinafter referred to as weft tracer or transverse tracer).

According to the disclosure, the system 1 for locating at least one tracer of the woven preform 3, 3a, 3b comprises:
- a camera 5;
- a light source 6 emitting an unpolarized incident beam f1 adapted to be directed towards the preform 3, 3a, 3b;
- a polarizer 7 with a first polarization direction, the polarizer 7 being adapted to polarize the unpolarized incident beam f1 before interacting with the preform 3, 3a, 3b to obtain a polarized incident beam f2;
- a cross analyzer 8 with a second polarization direction.

The camera 5 is adapted to film a reflected beam f3 resulting from the interaction of the polarized incident beam f2 with the preform 3, 3a, 3b, the reflected beam f3 having previously passed through the cross analyzer 8, so as to locate the tracer of the preform 3, 3a, 3b.

Such a system 1 allows to easily locate the tracer or the tracers in the preform. The tracer or the tracers appear distinctly on the images filmed by the camera 5. The system 1 allows to significantly accentuate the color of the fibers of the first material on the images filmed by the camera 5.

For this purpose, the system 1 exploits the differences in optical properties between the first material and the second material, in order to highlight the fibers of the first material on the images filmed by the camera 5. The second material has a specular reflection while the first material has a diffuse reflection. Unlike the diffuse reflection, a specular reflection has the particularity of preserving the polarization. The cross analyzer 8 thus allows to stop the light rays reflected by the fibers of the second material and to let pass only the light rays reflected by the fibers of the first material of the tracer, so as to make the fibers of the first material appear distinctly on the images filmed by the camera 5. In other words, the camera 5 only films the light rays reflected by the fibers of the first material of the tracer.

The polarizer 7 has a first polarization direction (or first transmission direction), the polarizer 7 allows the light rays of the incident beam to be polarized linearly (or straight) along the first polarization direction. For this reason, such a polarizer 7 is referred to as "linear polarizer" or "rectilinear polarizer".

Advantageously, the cross analyzer 8 has a second direction of polarization (or second direction of transmission), perpendicular or substantially perpendicular to the first direction of polarization of the polarizer 7, the analyzer 8 being as such crossed with the polarizer 7. The polarization directions are defined in a plane perpendicular to the propagation direction of the beam.

Advantageously, the system 1 comprises a diffuser (not shown), the unpolarized incident beam f1 passing through the diffuser before passing through the polarizer 7. Such a diffuser allows to obtain a homogeneous lighting.

The system 1 can comprise a screen 9 on which images filmed by the camera 5 are displayed live. Such a screen 9 can for example allow an operator to locate the tracer, so as to position or control the preform.

The system 1 may comprise a control device configured to control the light source 6 and the camera 5. In the event that the system comprises a screen 9, the control device can also be configured to control the screen 9. The control device can be configured to automatically process the images filmed by the camera 5. In order to automatically process the images taken by the camera 5, the control device can comprise, for example, a computer (or an information processing system) and an image processing software.

Advantageously, the images filmed by the camera 5 are recorded in order to guarantee the traceability of the preforms, and more generally of the composite material parts obtained by the manufacturing method.

Advantageously, the camera 5 has a variable field of view, the latter is set to cover the desired field.

Advantageously, the light source 6 comprises a plurality of light emitting diodes (LED). The light emitting diodes are, for example, in the form of an LED bar.

The disclosure also relates to a method for positioning a woven preform 3, 3a, 3b with respect to a mold 11a, 11b, the preform 3, 3a, 3b comprising on its surface at least one strand 2 comprising fibers of the first material forming a tracer and strands 4 of fibers of the second material, by means of the system 1.

The positioning method comprises a step a) consisting of positioning the preform 3, 3a, 3b with respect to the mold 11a, 11b from the images filmed by the camera 5 by positioning the tracer of the preform 3, 3a, 3b with respect to a reference frame.

The step a) of the positioning method can be performed by an operator using a screen 9 of the system 1 on which the images filmed by the camera 5 are displayed live.

The step a) of the positioning method can be performed automatically, in particular by means of a control device of the system 1.

The positioning method can be implemented throughout the manufacturing method of a composite material part, and in particular during the cutting operation and/or during the forming operation and/or during the injection operation.

The disclosure also relates to a method for controlling a woven preform 3, 3a, 3b, the preform 3, 3a, 3b comprising on its surface at least one strand 2 comprising fibers of the first material forming a tracer and strands 4 of fibers of the second material, by means of the system 1.

The control method comprises a step a) of controlling that the tracer of the preform 3, 3a, 3b is within a predefined interval from the images filmed by the camera 5.

The step a) of the control method can be performed by an operator using a screen 9 of the system 1 on which the images filmed by the camera 5 are displayed live.

The step a) of the control method can be performed by a control device of the system 1 configured to automatically process images filmed by the camera 5.

The control method can be implemented throughout the manufacturing method of a composite material part, and in particular during the cutting operation and/or during the forming operation and/or during the injection operation.

FIGS. 2 to 4 show a forming operation of a preform of a fan vane 3a.

FIG. 2 illustrates the planar vane preform 3a adapted to be formed in three-dimension using a forming mold 11a shown in FIGS. 3 and 4.

As shown in FIG. 2, the vane preform 3a comprises a portion 13 adapted to form a vane root, hereinafter referred to as the "root portion 13". The vane preform 3a also comprises a portion 14 adapted to form a vane blade, hereinafter referred to as "blade portion 14". Finally, the vane preform 3a comprises a junction 15 between the root portion 13 and the blade portion 14, the junction 15 being adapted to form blade bearing surfaces.

In particular, the vane preform 3a comprises a lower transverse tracer 2a on the surface at the level of the junction 15.

As shown in FIGS. 3 and 4, the forming mold 11a comprises an indentation 16 for three-dimensionally forming the vane preform 3a. More specifically, the indentation 16 comprises a stretch 17 adapted to form the root portion 13 in three dimensions, hereinafter referred to as the "root stretch 17". The indentation 16 also comprises a stretch 18 adapted to three-dimensionally form the blade portion 14, hereinafter referred to as the "blade stretch 18". Finally, the indentation 16 comprises a stretch 19 adapted to form the junction 15 in three dimensions, hereinafter referred to as the "junction stretch 19".

The forming mold 11a also comprises a slit 12 opening both on a lower face of the mold 11a and into the indentation 16. The slit 12 is located at the level of the junction stretch 19 and forms a reference frame used in particular for positioning the vane preform 3a relative to the mold 11a.

The forming mold 11a also comprises a wedge 21 adapted to be attached to two projecting supports 22 bordering the indentation 16 at the level of the root stretch 17. The wedge 21 allows to immobilize the root portion 13 and the junction 15 of the vane preform 3a by compression.

As illustrated in FIG. 3, for this forming operation, the system 1 comprises a screen 9 on which the images filmed by the camera 5 are displayed live. The incident beam f1 from the light source 6 is directed towards the vane preform 3a placed in the indentation 16 via the slit 12 of the mold 11a.

During the forming operation, the positioning method described above is implemented to position the vane preform 3a relative to the forming mold 11a.

An operator manually positions the lower transverse tracer 2a of the vane preform 3a in the slit 12 forming the reference frame, using the screen 9 of the system 1 on which the images filmed by the camera 5 are displayed live. To do this, using the screen 9, the operator displaces the vane preform 3a on the mold 11a until the lower transverse tracer 2a is comprised in the slit 12.

It is noted that the vane preform 3a is positioned relative to the forming mold 11a not only by positioning the lower transverse tracer 2a in the slit 12 but also by making coincide an upper transverse tracer (not shown) of the vane preform 3a with a reference projected onto the mold 11a by one or more lasers. The upper transverse tracer is for example placed at the level of the junction 15. The reference projected by the laser or the lasers defines the theoretical position of the upper transverse tracer. Following the positioning of the vane preform 3a, the operator immobilizes the root portion 13 and the junction 15 of the vane preform 3a by attaching the wedge 21 on the two supports 22 of the mold 11a, the root portion 13 and the junction 15 being then compressed between the indentation 16 and the wedge 21.

During the forming operation, the control method described above is implemented to control the position of the vane preform 3a following its positioning, and in other words following the placement of the wedge 21 on the two supports 22.

Indeed, an operator controls that the lower transverse tracer 2a is well within the interval defined by the slit 12, with the help of the screen 9 of the system 1 on which the images filmed by the camera 5 are displayed live.

It is noted that the vane preform 3a is here shaped by an operator who spreads the preform 3a into the indentation 16 until upper longitudinal tracers (not shown) of the preform 3a coincide with references projected onto the mold 11a by one or more lasers. The references projected by the laser or the lasers define the theoretical positions of each of the upper longitudinal tracers.

FIGS. 5 and 6 show a forming operation of a preform of a fan casing 3b.

FIG. 5 illustrates the planar casing preform 3b adapted to three-dimensional form using a forming mold 11b shown in FIG. 6.

As shown in FIG. 5, the casing preform 3b is in the form of a rectangular sheet. In particular, the casing preform 3b comprises at least one upper longitudinal tracer 2b on the surface.

As shown in FIG. 6, the forming mold 11b comprises a cylindrical indentation 23 for three-dimensionally forming the casing preform 3b. The mold 11b is rotatable about an axis of rotation X passing through the axis of revolution of the cylindrical indentation 23.

As illustrated in FIG. 6, for this forming operation, the system 1 comprises a control device 10 configured to automatically process images filmed by the camera 5. The system 1 also comprises a screen 9 on which the images filmed by the camera 5 are displayed live. The incident beam f1 from the light source 6 is directed towards the casing preform 3b placed on the indentation 23.

It is noted that the casing preform 3b is here shaped by an operator who wraps the preform 3b around the indentation 23 by making coincide the upper longitudinal tracer 2b of the preform 3b with a reference projected onto the mold 11b by one or more lasers. The reference projected by the laser or the lasers defines the theoretical position of the upper longitudinal tracer 2b.

During the forming operation, the control method described above is implemented to control the forming of the casing preform 3b.

The control device 10 automatically controls that the upper longitudinal tracer 2b is within a predefined range. For this purpose, the control device 10 compares the actual position of the upper longitudinal tracer 2b and the predefined interval. The actual position of the upper longitudinal tracer 2b is determined, for example, from the images taken by the camera 5 and from an image processing software.

In the present application, the terms "lower" and "upper" associated with the preforms 3a, 3b and the molds 11a, 11b are defined with respect to the positions of the latter in the FIGURES.

FIG. 7 is an image filmed by a camera of a system according to the prior art of a preform sample 3 comprising one longitudinal tracer and two transverse tracers.

FIG. 8 is an image filmed by a camera 5 of a system 1 according to the disclosure of the same preform sample 3.

It can be seen that the system 1 according to the disclosure allows to significantly accentuate the white color of the tracers, and thus to easily locate the tracers of the preform 3, for the purpose, for example, of positioning or controlling the preform 3.

The invention claimed is:

1. A method for positioning a woven preform of a composite material part with respect to a mould by a system, the preform comprising on its surface at least one strand comprising fibers of a first material forming a tracer and strands of fibers of a second material, the first material being chosen from glass, aramid and alumina oxide, the second material being chosen from carbon and silicon carbide,
wherein the system includes:
a camera,
a light source emitting an unpolarized incident beam adapted to be directed towards the preform, and a polarizer having a first polarization direction, the polarizer being adapted to polarize the unpolarized incident beam before interacting with the preform to obtain a polarized incident beam, a cross analyzer having a second polarization direction, wherein the camera is adapted to film a reflected beam resulting from the interaction of the polarized incident beam with the preform, the reflected beam having previously passed through the cross analyzer, so as to locate the tracer of the preform, the method comprising a step of:

a) positioning the preform with respect to the mould from the images filmed by the camera by positioning the tracer of the preform with respect to a reference frame.

2. The positioning method according to claim 1, wherein the step a) is performed by an operator with the aid of a screen on which the images filmed by the camera are displayed live.

3. The positioning method according to claim 1, wherein the reference frame is formed by a slit opening into an indentation of the mould in which the preform is located, the unpolarized incident beam of the light source being directed towards the preform via the slit.

4. The positioning method according to claim 1, wherein the positioning method is implemented during a cutting operation of the preform in a cutting mould and/or a three-dimensional forming operation of the preform in a forming mould and/or an injection operation of a matrix into an injection mould in which the preform is located.

5. A method for controlling a woven preform of a composite material part by a system, the preform comprising on its surface at least one strand comprising fibers of a first material forming a tracer and strands of fibers of a second material, the first material being chosen from glass, aramid and alumina oxide, the second material being chosen from carbon and silicon carbide, wherein the system includes:
a camera,
a light source emitting an unpolarized incident beam adapted to be directed towards the preform,
a polarizer having a first polarization direction, the polarizer being adapted to polarize the unpolarized incident beam before interacting with the preform to obtain a polarized incident beam, and
a cross analyzer having a second polarization direction, wherein the camera is adapted to film a reflected beam resulting from the interaction of the polarized incident beam with the preform, the reflected beam having previously passed through the cross analyzer, so as to locate the tracer of the preform, the method comprising a step of:
a) controlling that the tracer of the preform is within a predefined interval from the images filmed by the camera.

6. The control method according to claim 5, wherein the step a) is performed by a control device configured to automatically process images filmed by the camera.

7. The control method according to claim 5, wherein the control method is implemented during a cutting operation of the preform in a cutting mould and/or a three-dimensional forming operation of the preform in a forming mould and/or an injection operation of a matrix into an injection mould in which the preform is located.

8. A set comprising:
a woven preform of a composite material part, wherein the preform comprises on its surface at least one strand comprising fibers of a first material forming a tracer and strands of fibers of a second material, wherein the first material is selected from the group consisting of glass, aramid and alumina oxide, and wherein the second material is selected from the group consisting of carbon and silicon carbide; and
a system for locating a tracer of the woven preform, wherein the system comprises:
a camera,
a light source emitting an unpolarized incident beam which is directed towards the preform;
a polarizer having a first polarization direction, the polarizer polarizing the unpolarized incident beam before interacting with the preform to obtain a polarized incident beam;
a cross analyzer having a second polarization direction, wherein the camera of the system films a reflected beam resulting from the interaction of the polarized incident beam with the preform, the reflected beam having previously passed through the cross analyzer, so as to locate the tracer of the preform.

9. The set according to claim 8, further comprising a diffuser, the unpolarized incident beam passing through the diffuser before passing through the polarizer.

10. The set system according to claim 8, further comprising a screen on which images filmed by the camera are displayed live.

11. The set according to claim 8, further comprising a control device configured to automatically process images filmed by the camera.

12. The set according to claim 8, wherein the light source comprises a plurality of light emitting diodes.

13. The set according to claim 8, wherein the first material is glass or aramid, and the second material is carbon.

* * * * *